UNITED STATES PATENT OFFICE.

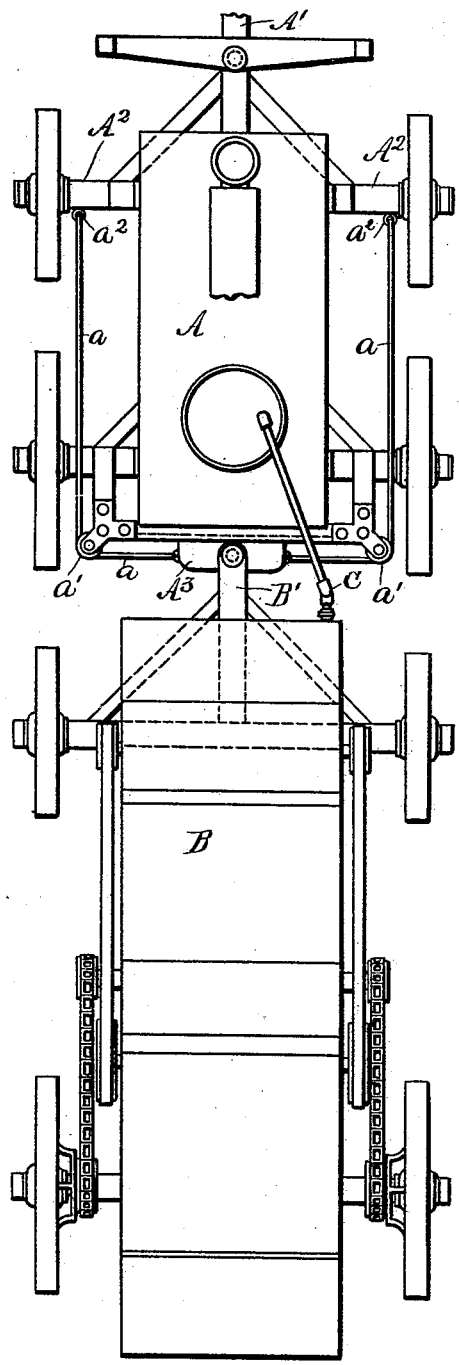

EPHRAIM HOWLAND, OF PONTIAC, MICHIGAN.

STEERING-GEAR FOR VEHICLES.

SPECIFICATION forming part of Letters Patent No. 453,369, dated June 2, 1891.

Application filed December 27, 1890. Serial No. 375,969. (No model.)

*To all whom it may concern:*

Be it known that I, EPHRAIM HOWLAND, a citizen of the United States, residing at Pontiac, county of Oakland, State of Michigan, have invented a certain new and useful Improvement in Steering-Gears for Vehicles; and I declare the following to be a full, clear, and exact description of the same, such as will enable others skilled in the art to which it pertains to make and use the same, reference being had to the accompanying drawing, which forms a part of this specification.

In the drawing is presented a plan view of apparatus embodying my invention.

My invention relates to steering-gear, and is designed more especially for the steering of vehicles where one vehicle is drawn by being attached to the rear end of the advance vehicle—as, for instance, where a thrashing-machine is drawn by a traction-engine, or where a vehicle is pushed by a traction-engine and a team employed in the lead for guiding the pole of the advance machine. It is well known that where one vehicle is thus connected to the rear end of another and the first or leading vehicle is turned around a corner—as, for instance, the corner of a block in a town or city—the rear vehicle will track inside the tracks of the leading vehicle. For this reason it is necessary to swing the leading vehicle around as large a curve as practicable in order that there may be room for the rear vehicle to follow without coming into contact with the curbing at the corner of the block. So, also, when turning out to pass a mud-hole the advance vehicle must keep well beyond the mud-hole before turning in again to the main track. Otherwise the rear vehicle would track inside of the track of the advance vehicle and run into the mud-hole. It is to overcome this difficulty that my invention is devised.

My invention consists, essentially, in locating a sliding or movable block or fastening at the rear end of the advance vehicle to which the rear vehicle is coupled. From this block or fastening cables lead to the right and left about pulleys and thence forward, and the extremities are engaged with the forward axle, so that when the forward axle is turned to the right or left the said block or fastening is shifted in the opposite direction, thus turning the forward axle of the rear vehicle in a direction opposite that taken by the forward axle of the advance vehicle, thus directing the rear vehicle in such a manner as will cause it to track substantially in the tracks of the forward vehicle as the same is turned to the right or left about the corner or to avoid an obstacle.

In carrying out my invention, A may represent a portable steam-boiler, and B may represent a thrashing-machine, or any other vehicles might be represented by the same letters.

A' is the guiding-pole of the advance vehicle, and $A^2$ its forward axle.

$A^3$ is a block or fastening at its rear end, to which the pole B' of the rear vehicle is coupled.

$a$ represents cables leading from the block or fastening $A^3$ about pulleys $a'$, and thence passing forward, there connecting at $a^2$ with the forward axle. The block $A^3$ is free to move crosswise of the forward vehicle and may be guided in any suitable manner. It is now apparent that if the forward vehicle is turned to the left the block $A^3$ will be shifted to the right, and so will turn the forward axle of the rear vehicle to the right, and in this way the rear vehicle is caused to track in substantially the same tracks as those formed by the advance vehicle. The effect will be the same if the advance vehicle is turned to the right or left to avoid an obstacle. The rear vehicle will follow in substantially the same tracks, and there is avoided the necessity of directing the advance vehicle on a larger circuit. This construction enables me to turn within a much smaller space than heretofore. In the particular instance shown I have presumed the rear vehicle to be a thrashing-machine provided with a steam-engine and traction mechanism, whereby it is caused to propel itself and push the engine in front of it, the team being employed in the lead simply for guiding the advance machine. I have also represented the forward vehicle as a portable steam-boiler supplying steam through any suitable steam hose or coupling C back to the engine on the thrashing-machine.

I would not limit myself in any way to any particular construction of the block A³.

What I claim is—

1. The combination, with two vehicles coupled together, one in rear of the other, of a shifting block or fastening at the rear of the advance vehicle, and chains or cables leading from said block or fastening laterally crosswise of the vehicle, thence about pulleys, and forward and connected at their extremities to the forward axle, whereby as the forward axle of the advance machine is turned in one direction it will operate to shift the said block and turn the forward axle of the rear machine in the opposite direction, substantially as and for the purposes described.

2. A vehicle designed to be coupled at its rear end with the pole of another vehicle, the same provided with a shifting block or fastening at its rear end, and a flexible connection therefrom with the forward axle, whereby as the forward axle is turned to the right or left said block or fastening is shifted in the opposite direction, substantially as and for the purposes described.

3. A vehicle designed to be coupled at its rear end with the pole of another vehicle, the same provided with a block or fastening at its rear end, said block or fastening connected by actuating mechanism with the forward axle, the construction being such that as the forward axle is turned to the right or left said block or fastening is correspondingly shifted to the left or right, substantially as and for the purposes described.

In testimony whereof I sign this specification in the presence of two witnesses.

EPHRAIM HOWLAND.

Witnesses:
MARION A. REEVE,
WELLS W. LEGGETT.